(12) United States Patent
Sutivong et al.

(10) Patent No.: US 8,228,949 B2
(45) Date of Patent: *Jul. 24, 2012

(54) QUASI-ORTHOGONAL MULTIPLEXING FOR A MULTI-CARRIER COMMUNICATION SYSTEM

(75) Inventors: Arak Sutivong, Bangkok (TH); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/762,750

(22) Filed: Apr. 19, 2010

(65) Prior Publication Data

US 2010/0195630 A1    Aug. 5, 2010

Related U.S. Application Data

(63) Continuation of application No. 10/887,710, filed on Jul. 8, 2004, now Pat. No. 7,724,777.

(60) Provisional application No. 60/580,810, filed on Jun. 18, 2004.

(51) Int. Cl.
*H04J 13/00* (2006.01)

(52) U.S. Cl. ........ 370/478; 455/330; 455/335; 455/336; 370/330; 370/335; 370/468; 370/343; 370/344

(58) Field of Classification Search .......... 370/203–210, 370/328–339; 375/267, 347; 455/101, 450, 455/509

See application file for complete search history.

(56) References Cited

U.S. PATENT DOCUMENTS

| | | | |
|---|---|---|---|
| 5,956,642 | A | 9/1999 | Larsson et al. |
| 6,529,729 | B1 | 3/2003 | Nodoushani et al. |
| 6,587,684 | B1 | 7/2003 | Hsu et al. |
| 6,622,017 | B1 | 9/2003 | Hoffman |
| 6,704,411 | B1 | 3/2004 | Nishidate |
| 6,882,847 | B2 * | 4/2005 | Craig et al. .......... 455/450 |

(Continued)

FOREIGN PATENT DOCUMENTS

EP    1043906    10/2000

(Continued)

OTHER PUBLICATIONS

Standards Proposal No. 4742, Proposed Revision of TIA/EIA-683-A, "Over the Air Provisioning of Mobile Stations in Spread Spectrum Systems," EIA/TIA Drafts, Dec. 20, 2000, XP017000419.

(Continued)

*Primary Examiner* — Ajit Patel
*Assistant Examiner* — Julio Perez
(74) *Attorney, Agent, or Firm* — Peng Zhu

(57) ABSTRACT

For quasi-orthogonal multiplexing in an OFDMA system, multiple (M) sets of traffic channels are defined for each base station. The traffic channels in each set are orthogonal to one another and may be pseudo-random with respect to the traffic channels in each of the other sets. The minimum number of sets of traffic channels (L) is used to support a given number of (U) terminals selected for data transmission, where $M \geq L \geq 1$ and $U \geq 1$. Each terminal transmits data and pilot symbols on its traffic channel. A base station receives data transmissions from all terminals and may perform receiver spatial processing on received symbols with spatial filter matrices to obtain detected data symbols. The spatial filter matrix for each subband may be derived based on channel response estimates for all terminals transmitting on that subband.

71 Claims, 6 Drawing Sheets

U.S. PATENT DOCUMENTS

| | | | |
|---|---|---|---|
| 6,961,567 | B1 | 11/2005 | Kuhn |
| 7,054,928 | B2 | 5/2006 | Segan et al. |
| 7,072,315 | B1 | 7/2006 | Liu et al. |
| 7,092,375 | B2 | 8/2006 | Pitsoulakis |
| 7,197,692 | B2 | 3/2007 | Sutivong et al. |
| 7,239,632 | B2 | 7/2007 | Kalavade et al. |
| 7,266,369 | B2 | 9/2007 | Moles et al. |
| 7,315,577 | B2 * | 1/2008 | Shao ............................ 375/260 |
| 7,536,626 | B2 | 5/2009 | Sutivong et al. |
| 7,724,777 | B2 | 5/2010 | Sutivong et al. |
| 2002/0097697 | A1 | 7/2002 | Bae et al. |
| 2002/0136276 | A1 | 9/2002 | Franceschini et al. |
| 2003/0165131 | A1 | 9/2003 | Liang et al. |
| 2004/0001429 | A1 | 1/2004 | Ma et al. |
| 2004/0043788 | A1 | 3/2004 | Mittal |
| 2004/0190640 | A1 * | 9/2004 | Dubuc et al. .................. 375/260 |
| 2005/0048997 | A1 | 3/2005 | Grobler et al. |
| 2005/0079863 | A1 | 4/2005 | Macaluso |
| 2006/0019694 | A1 | 1/2006 | Sutivong et al. |
| 2006/0193373 | A1 | 8/2006 | Agee et al. |
| 2006/0209927 | A1 | 9/2006 | Khandekar et al. |
| 2007/0054626 | A1 | 3/2007 | Li et al. |
| 2007/0177631 | A1 | 8/2007 | Popovic et al. |

FOREIGN PATENT DOCUMENTS

| | | |
|---|---|---|
| GB | 2372675 | 8/2002 |
| JP | 09321669 | 12/1997 |
| JP | 11196043 | 7/1999 |
| JP | 2000092009 A | 3/2000 |
| JP | 2000515698 T | 11/2000 |
| JP | 2002518872 T | 6/2002 |
| RU | 2216105 C2 | 11/2003 |
| WO | WO9804055 A1 | 1/1998 |
| WO | WO9965155 A1 | 12/1999 |
| WO | 0217073 | 2/2002 |
| WO | WO0231991 | 4/2002 |
| WO | WO0233848 A2 | 4/2002 |
| WO | WO0249306 | 6/2002 |
| WO | WO03090364 A2 | 10/2003 |
| WO | WO2004032443 A1 | 4/2004 |

OTHER PUBLICATIONS

Taylor, A., "Over-The-Air Service Provisioning," Annual Review of Communications, International Engineering Consortium, Chicago, IL, US, 1998, XP000793196, vol. 51, pp. 953-959.

International Search Report—PCT/US04/034513, International Search Authority—European Patent Office, Feb. 28, 2005.

3GPP2 C.S0002-0 Version 1.0, "Physical Layer Standard for CDMA2000 Spread Spectrum Systems," Jul. 1999, pp. 2-103-2-104.

Chennakeshu, et al. "Capacity Analysis of a TDMA-Based Slow-Frequency-Hopped Cellular System," IEEE Transaction on Vehicular Technology, vol. 45., No. 3 Aug. 1996, pp. 531-542.

Chiani, et al. "Outage Evaluation for Slow Frequency-Hopping Mobile Radio Systems" IEEE Transactions on Communications, vol. 47, No. 12 Dec. 1999. pp. 1865-1874.

Das et al., "On the Reverse Link Interference Structure for Next Generation Cellular Systems," Global Telecommunications Conference, 2004. GLOBECOM '04, IEEE, vol. 5 IEEE Nov. 29-Dec. 3, 2004, pp. 3068-3072.

Don Torrieri, "Cellular Frequency-Hopping CDMA Systems," IEEE Vehicular Technology Conference, May 16, 1999, pp. 919-925, vol. 2.

Hui Won Je et al, "A Novel Multiple Access Scheme for Uplink Cellular Systems," Vehicular Technology Conference, 2004, VTC2004-fall, 2004 IEEE 60th Los Angeles, CA, US, Sep. 26-29, 2004, Piscataway, NY, pp. 984-988.

International Search Report & Written Opinion PCT/US05/021056—International Search Authority—European Patent Office Oct. 13, 2005.

Kim, et al. "Performance of TDMA System With SFH and 2-Bit Differentially Detected GMSK Over Rayleigh Fading Channel," IEEE Vehicular Technology Conference, Apr. 28, 1996, pp. 789-793.

Kostic, et al. "Dynamic Frequency Hopping in Wireless Cellular Systems-Simulations of Full-Replacement and Reduced-Overhead Methods," IEEE Vehicular Technology Conference, May 16, 1999, pp. 914-918.

Kostic, et al. "Fundamentals of Dynamic Frequency Hopping in Cellular Systems," IEEE Journal on Selected Areas in Communications, vol. 19, No. 11, Nov. 2001, pp. 2254-2266.

Sandeep Chennakeshu et al., "A comparison of diversity schemes for a mixed-mode slow frequency-hopped cellular system," Global Telecommunications Conference, 1993, including a Communications Theory Mini-Conference. Technical Program Conference Record, IEEE in Houston. GLOBECOM "93., IEEE, Nov. 29, 1993, pp. 1749-1753, vol. 3.

Telecommunications Industry Association, "Mobile Station-Base Station Compatibility Standard for Dual-Mode Wideband Spread Spectrum Cellular System," TIA/EIA-95, Jul. 1993. (688 Pages).

TIA/EIA/IS-2000 Standards for CDMA2000 Spread Spectrum Systems 3GPP2 C.S0001-0 Version 1.0, Jul. 1999. (16 pages).

Taiwan Search Report—TW094120052—TIPO-Aug. 23, 2011.

* cited by examiner

QUASI-ORTHOGONAL MULTIPLEXING FOR A MULTI-CARRIER COMMUNICATION SYSTEM

CROSS-REFERENCE TO RELATED APPLICATION

The present application for patent is a Continuation of U.S. patent application Ser. No. 10/887,710, entitled "QUASI-ORTHOGONAL MULTIPLEXING FOR A MULTI-CARRIER COMMUNICATION SYSTEM," filed Jul. 8, 2004, now allowed, which claims priority to U.S. Provisional Patent Application Ser. No. 60/580,810, filed Jun. 18, 2004, both of which are incorporated herein by reference in their entirety.

BACKGROUND

I. Field

The present invention relates generally to data communication, and more specifically to data transmission in a multi-carrier multiple-access communication system.

II. Background

A multiple-access system can concurrently support communication for multiple terminals on the forward and reverse links. The forward link (or downlink) refers to the communication link from the base stations to the terminals, and the reverse link (or uplink) refers to the communication link from the terminals to the base stations. Multiple terminals may simultaneously transmit data on the reverse link and/or receive data on the forward link. This may be achieved by multiplexing the multiple data transmissions on each link to be orthogonal to one another in time, frequency, and/or code domain. Complete orthogonality is typically not achieved in most instances due to various factors such as channel conditions, receiver imperfections, and so on. Nevertheless, the orthogonal multiplexing ensures that the data transmission for each terminal minimally interferes with the data transmissions for the other terminals.

A multi-carrier communication system utilizes multiple carriers for data transmission. The multiple carriers may be provided by orthogonal frequency division multiplexing (OFDM), discrete multi tone (DMT), some other multi-carrier modulation techniques, or some other construct. OFDM effectively partitions the overall system bandwidth into multiple (K) orthogonal frequency subbands. These subbands are also referred to as tones, sub-carriers, bins, frequency channels, and so on. Each subband is associated with a respective sub-carrier that may be modulated with data.

An orthogonal frequency division multiple access (OFDMA) system is a multi-access system that utilizes OFDM. An OFDMA system may use time and/or frequency division multiplexing to achieve orthogonality among multiple data transmissions for multiple terminals. For example, different terminals may be allocated different subbands, and the data transmission for each terminal may be sent on the subband(s) allocated to the terminal. By using disjoint or non-overlapping subbands for different terminals, interference among the multiple terminals may be avoided or reduced, and improved performance may be achieved.

The number of subbands available for data transmission is limited (to K) by the OFDM structure used for the OFDMA system. The limited number of subbands places an upper limit on the number of terminals that may transmit simultaneously without interfering one another. In certain instances, it may be desirable to allow more terminals to transmit simultaneously, e.g., to better utilize the available system capacity. There is therefore a need in the art for techniques to concurrently support more terminals in an OFDMA system.

SUMMARY

Techniques that can support simultaneous transmission for more terminals than the number of orthogonal transmission units (or orthogonal dimensions) available in the system are described herein. Each such "transmission unit" may correspond to a group of one or more subbands in one or more symbol periods, and is orthogonal to all other transmission units in frequency and time. These techniques are called "quasi-orthogonal multiplexing" and may be used to more fully utilize additional capacity that may be created in a spatial dimension by employing multiple antennas at a base station. These techniques can also reduce the amount of interference observed by each terminal, which may improve performance.

In an embodiment of quasi-orthogonal multiplexing that is suitable for an OFDMA system, multiple (M) sets of traffic channels are defined for each base station in the system. Each set contains multiple (N) traffic channels, e.g., one traffic channel for each orthogonal transmission unit available in the system. Each traffic channel is associated with the particular orthogonal transmission unit (e.g., the particular subbands) to use for each transmission interval. For a frequency hopping OFDMA (FH-OFDMA) system, each traffic channel may be associated with an FH sequence that pseudo-randomly selects different subbands in different transmission intervals or hop periods. The traffic channels in each set are orthogonal to one another and may be pseudo-random with respect to the traffic channels in each of the other M−1 sets. A total of M·N traffic channels are then available for use in the system. The minimum number of sets of traffic channels (L) may be used to support a given number of (U) terminals selected for data transmission. Each terminal may be assigned a traffic channel selected from the L sets of traffic channels.

Each terminal transmits data symbols (which are modulation symbols for data) on its traffic channel. Each terminal also transmits pilot symbols (which are modulation symbols for a pilot) on its traffic channel to allow a base station to estimate the response of the wireless channel between the terminal and the base station. The U terminals may transmit simultaneously on their assigned traffic channels.

The base station receives data transmissions from the U terminals and obtains a vector of received symbols for each subband in each symbol period. The base station may derive a spatial filter matrix for each subband based on channel response estimates obtained for all terminals transmitting on that subband. The base station may perform receiver spatial processing on the received symbol vector for each subband with the spatial filter matrix for that subband to obtain detected data symbols, which are estimates of the data symbols sent by the terminals using the subband.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The quasi-orthogonal multiplexing techniques described herein may be used for various multi-carrier communication systems, e.g., an OFDM-based system such as an OFDMA system. These techniques may also be used for single-antenna and multi-antenna systems. A single-antenna system utilizes one antenna for data transmission and reception. A multi-antenna system utilizes one or multiple antennas for data transmission and multiple antennas for data reception. These techniques may also be used for time division duplexed (TDD) and frequency division duplexed (FDD) systems, for the forward and reverse links, and with or without frequency hopping. For clarity, quasi-orthogonal multiplexing is described below for the reverse link of a multi-antenna FH-OFDMA system.

Figure 1:
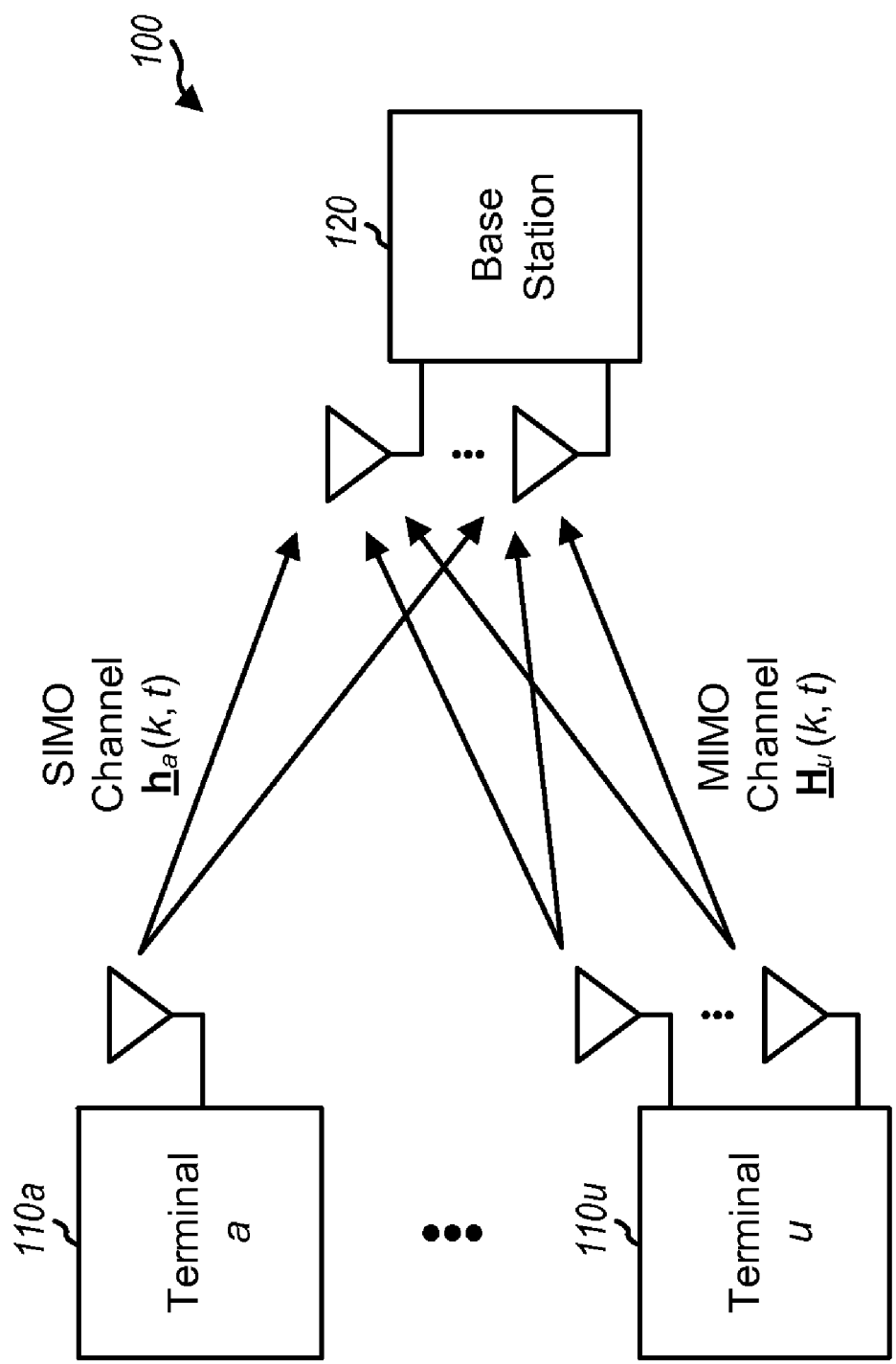
FIG. 1 shows multiple terminals and a base station in an OFDMA system.

FIG. 1 shows multiple terminals 110a through 110u and a base station 120 in an OFDMA system 100. A base station is generally a fixed station that communicates with the terminals and may also be referred to as an access point or some other terminology. A terminal may be fixed or mobile and may also be referred to as a mobile station, a wireless device, or some other terminology. The terms "terminal" and "user" are also used interchangeably herein. Base station 120 is equipped with multiple (R) antennas for data transmission and reception. A terminal may be equipped with one antenna (e.g., terminal 110a) or multiple antennas (e.g., terminal 110u) for data transmission and reception. The R antennas at base station 120 represent the multiple-input (MI) for transmissions on the forward link and the multiple-output (MO) for transmissions on the reverse link. If multiple terminals are selected for simultaneous transmission, then the multiple antennas for these selected terminals collectively represent the multiple-output for forward link transmissions and the multiple-input for reverse link transmissions.

Figure 2:
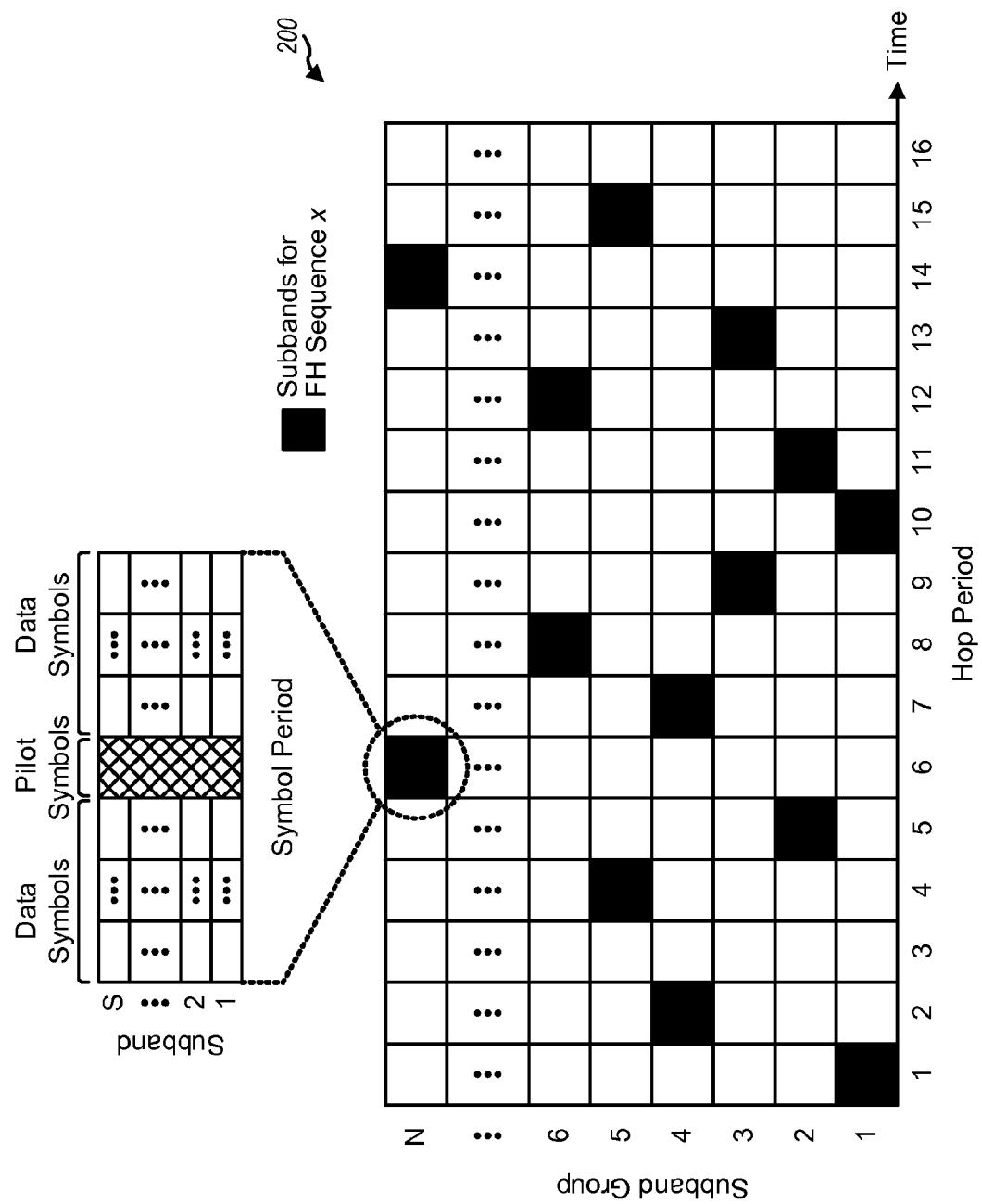
FIG. 2 illustrates frequency hopping in the OFDMA system.

FIG. 2 illustrates frequency hopping (FH) transmission scheme 200 that may be used for the OFDMA system. Frequency hopping can provide frequency diversity against deleterious path effects and randomization of interference. With frequency hopping, each terminal/user may be assigned a different FH sequence that indicates the particular subband(s) to use in each "hop" period. An FH sequence may also be called a hop pattern or some other terminology. A hop period is the amount of time spent on a given subband, may span one or multiple symbol periods, and may also be called a transmission interval or some other terminology. Each FH sequence may pseudo-randomly select subbands for the terminal. Frequency diversity is achieved by selecting different subbands across the K total subbands in different hop periods. FH sequences and traffic channels may be viewed as convenient ways of expressing assignment of subbands.

The FH sequences for different users in communication with the same base station are typically orthogonal to one another so that no two users use the same subband in any given hop period. This avoids "intra-cell" or "intra-sector" interference among the terminals communicating with the same base station (assuming that orthogonality is not destroyed by some other factor). The FH sequences for each base station may be pseudo-random with respect to the FH sequences for nearby base stations. Interference between two users communicating with two different base stations occurs whenever the FH sequences for these users select the same subband in the same hop period. However, this "inter-cell" or "inter-sector" interference is randomized due to the pseudo-random nature of the FH sequences.

For the embodiment shown in FIG. 2, the subbands usable for data transmission are arranged into N groups. Each group contains S subbands, where in general $N>1$, $S \geq 1$, and $N \cdot S \leq K$. The subbands in each group may be contiguous, as shown in FIG. 2. The subbands in each group may also be non-contiguous, e.g., uniformly distributed across the K total subbands and evenly spaced apart by S subbands. Each user may be assigned one group of S subbands in each hop period. Data symbols may be time division multiplexed with pilot symbols, which are known a priori by both the terminal and base station, as shown in FIG. 2.

Interference may be avoided or reduced among all users communicating with the same base station if their FH sequences are orthogonal to one another. In this case, the users are assigned non-overlapping groups of subbands or, equivalently, a subband is only used by at most one user at any given time. Complete orthogonality is typically not achieved due to channel conditions, receiver imperfections, unsynchronized timing at the terminals, and so on. The loss of orthogonality may cause inter-carrier interference (ICI) and inter-symbol interference (ISI). However, the ICI and ISI may be small in comparison to the interference that would be observed if the users are not assigned orthogonal FH sequences.

The number of subband groups available for data transmission is limited, e.g., to N for the embodiment shown in FIG. 2. If one subband group is assigned to each user, then more than N users may be supported by time division multiplexing (TDM) the users and allowing different sets of up to N users to transmit on up to N groups of subbands in different hop periods. More than N orthogonal transmission units may thus be created in the frequency and time domains, where each transmission unit is orthogonal to all other transmission units in frequency and time. The transmission units may also be viewed as orthogonal dimensions. The time division multiplexing of users may be undesirable since it reduces the amount of time available for data transmission, which may then limit the data rates achievable by the users.

In certain instances, it may be desirable to support more users than the number of available orthogonal transmission units. For example, additional capacity may be created in the spatial dimension by employing multiple antennas at the base station. The base station may then be able to support more users with the additional capacity. However, the number of orthogonal transmission units available in the OFDMA system is determined by the system design and is typically limited and finite for a given system bandwidth and a given time duration. For simplicity, the following description assumes that time division multiplexing is not used and N orthogonal transmission units are available in the system, although this is not a requirement for quasi-orthogonal multiplexing. Once all of the available transmission units have been assigned to users, it is no longer possible to support additional users while still maintaining orthogonality among all of the users.

Quasi-orthogonal multiplexing can allow more users to simultaneously communicate on the reverse link, e.g., to more fully utilize the additional capacity created by the multiple antennas at the base station. In an embodiment, multiple (M) sets of FH sequences are defined for each base station. Each set contains N FH sequences, or one FH sequence for each orthogonal transmission unit available in the system. A total of M·N FH sequences are then available for use in the system.

Figure 3:
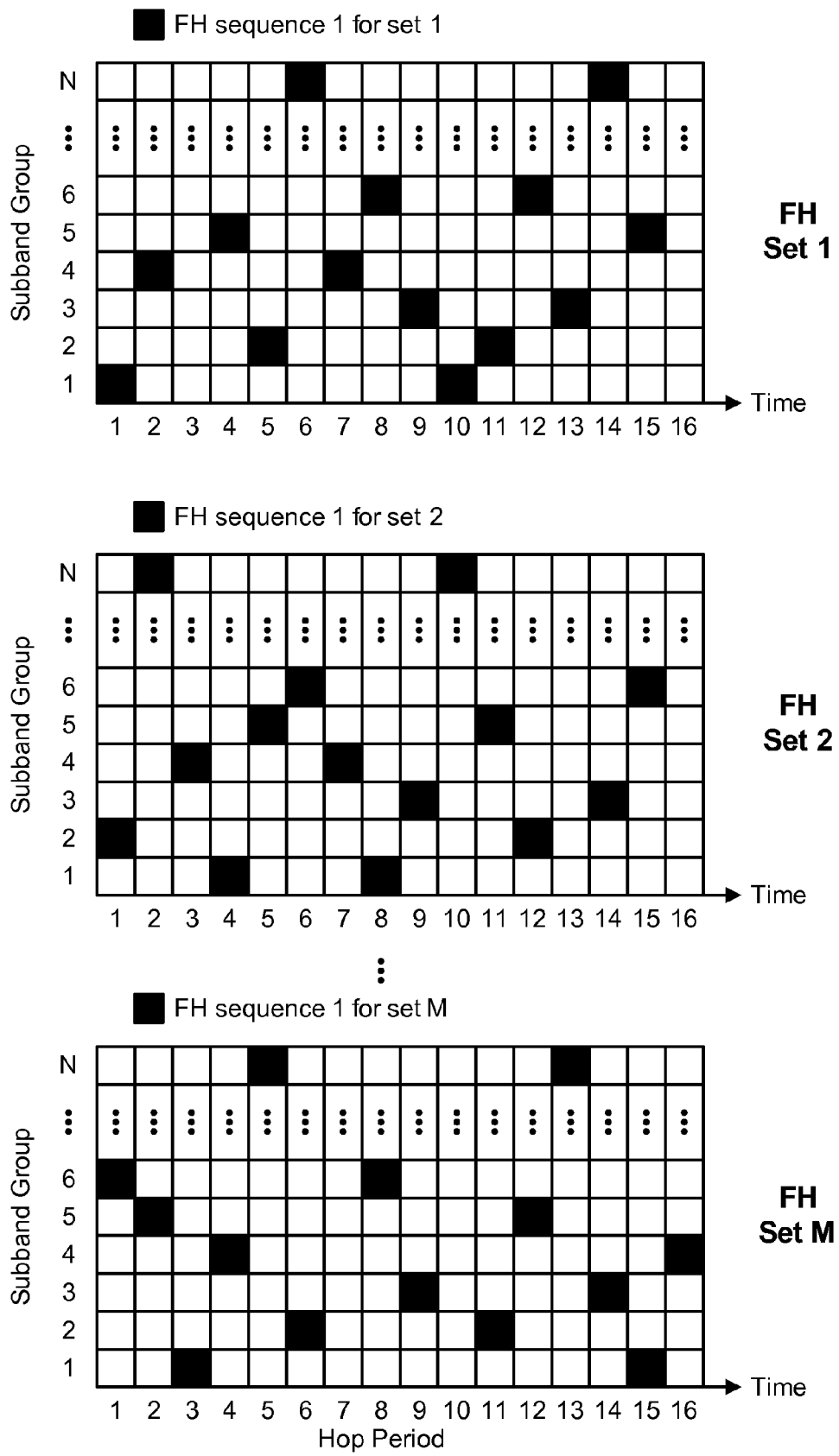
FIG. 3 shows M sets of FH sequences for quasi-orthogonal multiplexing.

FIG. 3 shows M sets of FH sequences that may be used for quasi-orthogonal multiplexing. The first FH sequence in each set is indicated by the darkened boxes on a frequency-time plane for that set. The remaining N−1 FH sequences in each set may be vertical and circular shifted versions of the first FH sequence in the set. The N FH sequences in each set are orthogonal to one another. Thus, no interference is observed among N data transmissions sent simultaneously by N users assigned with the N FH sequences in any given set (assuming no loss of orthogonality due to other factors). The FH sequences in each set may also be pseudo-random with respect to the FH sequences for each of the M−1 other sets. In this case, data transmissions sent simultaneously using the FH sequences in any one set would observe randomized interference from data transmissions sent using the FH sequences in the other M−1 sets. The M sets of N FH sequences may be generated in various manners.

In one embodiment, the N FH sequences for each set are derived based on a pseudo-random number (PN) code assigned to that set. For example, the 15-bit short PN codes defined by IS-95 and IS-2000 may be used. The PN code may be implemented with a linear feedback shift register (LFSR). For each hop period, the LFSR is updated and the content of the LFSR is used to select the subbands for the N FH sequences in the set. For example, a binary number corresponding to the B least significant bits (LSBs) in the LFSR may be denoted as $PN_l(t)$, where $B=\log_2(N)$, l is an index of the M sets of FH sequences, and t is an index for hop period. The N FH sequences in set l may then be defined as:

$$f_{l,i}(t)=([PN_l(t)+i] \bmod N)+1, \text{ for } l=1 \ldots M \text{ and } i=1 \ldots N, \quad \text{Eq (1)}$$

where i is an index for the N FH sequences in each set; and
$f_{l,i}(t)$ is the i-th FH sequence in set l.

The +1 in equation (1) accounts for an indexing scheme that starts with '1' instead of '0'. The FH sequence $f_{l,i}(t)$ indicates the particular subband(s) to use for each hop period t.

To simplify implementation, the M PN codes used for the M sets of FH sequences may be defined to be different time shifts of a common PN code. In this case, each set is assigned a unique time shift, and the PN code for that set may be identified by the assigned time shift. The common PN code may be denoted as PN(t), the time shift assigned to set l may be denoted as $\Delta T_l$, and the binary number in the LFSR for set l may be denoted as $PN(t+\Delta T_l)$. The N FH sequences in set l may then be defined as:

$$f_{l,i}(t)=([PN(t+\Delta T_l)+i] \bmod N)+1, \text{ for } l=1 \ldots M \text{ and } i=1 \ldots N. \quad \text{Eq (2)}$$

In another embodiment, the M sets of FH sequences are defined based on M different mapping tables, one table for each set. Each mapping table may implement a random permutation of an input. Each mapping table receives an index i for the i-th FH sequence in the set associated with the table and provides the subband(s) to use for this FH sequence in each hop period t. Each mapping table may be defined to be pseudo-random with respect to the other M−1 mapping tables.

The M sets of N FH sequences may also be defined and generated in other manners, and this is within the scope of the invention.

FH sequences may be assigned to the users in a manner to reduce the amount of intra-cell interference observed by all of the users. For simplicity, the following description assumes that one orthogonal transmission unit is assigned to each user selected for transmission. If the number of users selected for data transmission (U) is less than or equal to the number of orthogonal transmission units (or U≦N), then the U users may be assigned orthogonal FH sequences in one set. If the number of users is greater than the number of orthogonal transmission units (or U>N), then additional FH sequences from one or more other sets may be used. Since the FH sequences from different sets are not orthogonal to one another and thus result in intra-cell interference, the smallest number of sets should be used at any given moment. The minimum number of sets (L) needed to support U users may be expressed as:

$$L = \left\lceil \frac{U}{N} \right\rceil \leq M, \quad \text{Eq (3)}$$

where "⌈x⌉" denotes a ceiling operator that provides an integer value that is equal to or greater than x.

If L sets of FH sequences are used for U users, then each user will observe interference from at most L−1 other users at any given moment and is orthogonal to at least U−(L−1) other users. If U is much larger than L, which is typically the case, then each user observes interference from a small number of users at any given moment. The U users may then be viewed as somewhat orthogonal, or "quasi-orthogonal", with one another.

Figure 4:
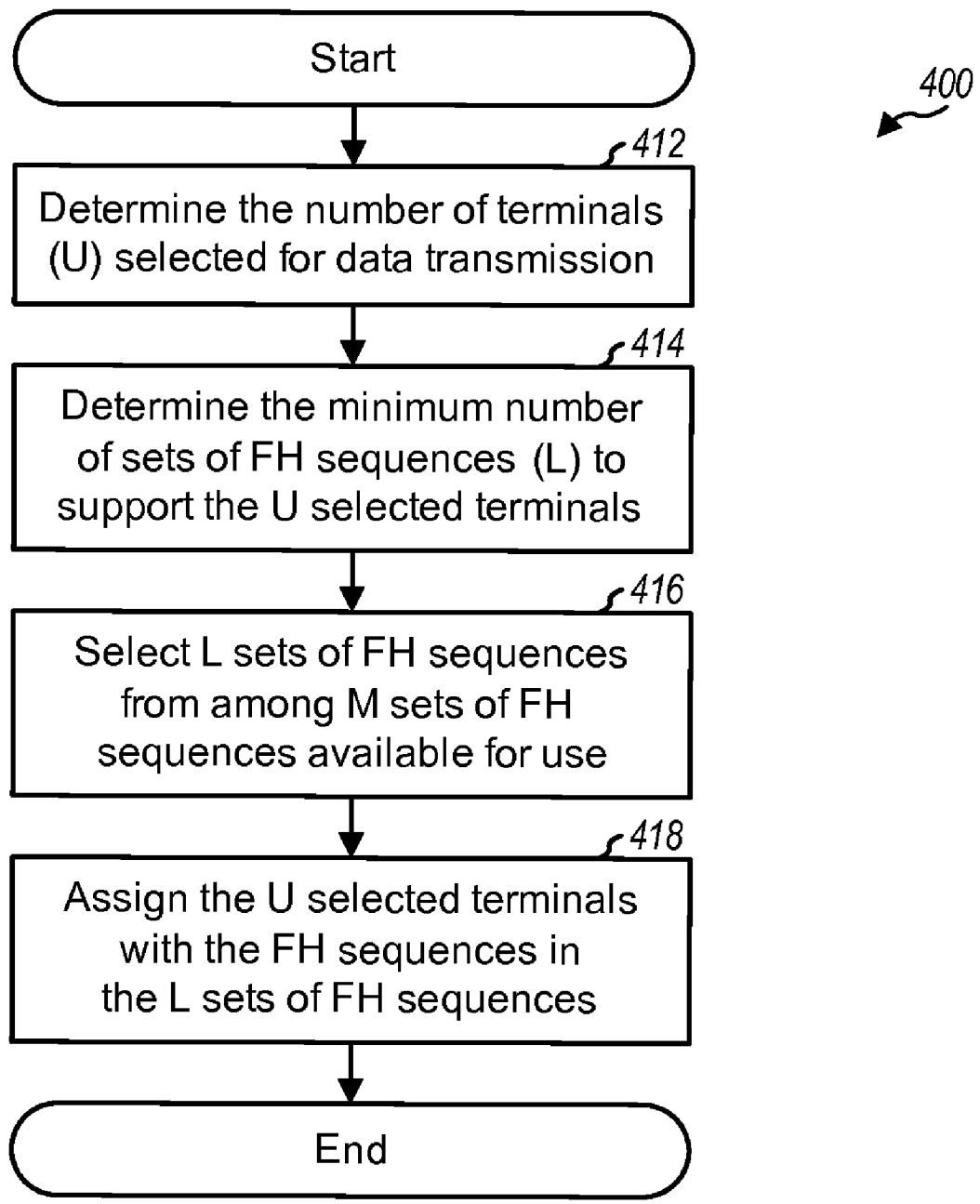
FIG. 4 shows a process for assigning FH sequences to U terminals.

FIG. 4 shows a flow diagram of a process 400 for assigning FH sequences to users with quasi-orthogonal multiplexing. Initially, the number of users selected for data transmission (U) is determined (block 412). The minimum number of sets of FH sequences (L) needed to support all of the selected users is then determined (block 414). If each selected user is assigned one FH sequence and if each set contains N FH sequences, then the minimum number of sets may be determined as shown in equation (3). L sets of FH sequences are then selected from among M sets of FH sequences available for use (block 416). Each selected user is then assigned one (or possibly multiple) FH sequences from the L sets of FH sequences (block 418).

The U selected users may be assigned FH sequences from the L sets in various manners. In one embodiment, users with similar received signal qualities are assigned FH sequences in the same set. Received signal quality may be quantified by a signal-to-interference-and-noise ratio (SINR) or some other measurement. For this embodiment, the U users may be ranked based on their SINRs, e.g., from highest SINR to lowest SINR. One user may be processed at a time, in sequential order based on the ranking, and assigned an FH sequence from a first set of FH sequences. Another set of FH sequences is used whenever all FH sequences in the first set have been assigned. This embodiment can map users with similar channel conditions to the same FH sequence set. For example, users located closer to the base station may achieve higher SINRs and may be assigned FH sequences in one set. Users located farther away from the base station (or "sector-edge"

users) may achieve lower SINRs and may be assigned FH sequences in another set. This embodiment may also facilitate power control of the users. For example, the sector-edge users may cause more interference to users in other sectors and may be directed to transmit at lower power levels.

In another embodiment, users with different received SINRs are assigned FH sequences in the same set. This embodiment may improve detection performance for users transmitting simultaneously using FH sequences in the same set. In yet another embodiment, users are categorized based on their "margins." Margin is the difference between the received SINR and the required SINR for a given rate and captures the excess SINR available for that rate. Users with larger margins are more likely to be decoded correctly than users with lower margins. Users with different margins may be assigned FH sequences in different sets, which may improve the likelihood of separating the users. For example, users with large margins may be detected and decoded first, the interference caused by these users may be estimated and canceled, then users with lower margins may be detected and decoded next, and so on. In yet another embodiment, users are multiplexed based on their spatial signatures. Users with uncorrelated signatures can be more easily separated using receiver spatial processing, as described below, even though these users may collide in time and frequency. Various combinations of spatial signatures for different groups of users may be evaluated to identify uncorrelated signatures. Users may also be categorized and multiplexed in other manners.

Quasi-orthogonal multiplexing may be used with or without power control. Power control may be implemented in various manners. In one power control scheme, the transmit power of each user is adjusted such that the received SINR for the user, as measured at the base station, is maintained at or near a target SINR. The target SINR may, in turn, be adjusted to achieve a particular level of performance, e.g., 1% packet error rate (PER). This power control scheme adjusts the amount of transmit power used for a given data transmission so that interference is minimized while still achieving the desired level of performance. In another power control scheme, the received SINR for each user is maintained within a range of SINRs. In yet another power control scheme, the received signal power for each user is maintained near a target value or within a range of values.

Frequency-hopping quasi-orthogonal frequency division multiple access (FH-QOFDMA) is a multiple-access scheme that uses quasi-orthogonal multiplexing (or M sets of N FH sequences) to support U users concurrently, where U may be greater than N. FH-QOFDMA has some advantages over conventional FH-OFDMA, which uses only one set of N FH sequences for all users. For a small number of users with U≦N, only one set of FH sequences is needed, and FH-QOFDMA degenerates to and is identical to conventional FH-OFDMA. However, FH-OFDMA is limited to only one set of FH sequences and may not be able to more fully utilize the additional capacity created in the spatial dimension by the use of multiple antennas at the base station. In contrast, FH-QOFDMA can utilize multiple sets of FH sequences to support more users to take advantage of the additional capacity. Although the U users are strictly not orthogonal to one another in the frequency and time domains with FH-QOFDMA when U>N, various techniques may be used to mitigate the deleterious effects of the intra-cell interference, as described below.

If the base station is equipped with multiple antennas for data reception, then the data transmissions from the U users may be separated using various receiver spatial processing techniques. Referring back to FIG. 1, a single-input multiple-output (SIMO) channel is formed between single-antenna terminal 110a and multi-antenna base station 120. The SIMO channel for terminal 110a may be characterized by an R×1 channel response vector $\underline{h}_a(k,t)$ for each subband, which may be expressed as:

$$\underline{h}_a(k,t) = \begin{bmatrix} h_{a,1}(k,t) \\ h_{a,2}(k,t) \\ \vdots \\ h_{a,R}(k,t) \end{bmatrix}, \text{ for } k = 1 \ldots K, \qquad \text{Eq (4)}$$

where k is an index for subband, and $h_{a,i}(k,t)$, for i=1 ... R, is the coupling or complex channel gain between the single antenna at terminal 110a and the R antennas at base station 120 for subband k in hop period t.

A multiple-input multiple-output (MIMO) channel is formed between multi-antenna terminal 110u and multi-antenna base station 120. The MIMO channel for terminal 110u may be characterized by an R×T channel response matrix $H_u(k,t)$ for each subband, which may be expressed as:

$$H_u(k,t)=[h_{u,1}(k,t) h_{u,2}(k,t) \ldots h_{u,T}(k,t)], \text{ for } k=1 \ldots K, \qquad \text{Eq (5)}$$

where $h_{u,j}(k,t)$, for j=1 ... T, is the channel response vector between antenna j at terminal 110u and the R antennas at base station 120 for subband k in hop period t. Each channel response vector $h_{u,j}(k,t)$ contains R elements and has the form shown in equation (4).

In general, each terminal may be equipped with one or multiple antennas and may be assigned S subbands in each hop period, where S≧1. Each terminal would then have one set of channel response vectors for each antenna, with each vector set containing S channel response vectors for the S subbands assigned to the terminal for hop period t. For example, if terminal m is assigned S subbands with indices k through k+S−1 in hop period t, then the vector set for each antenna j of terminal m would contain S channel response vectors $h_{m,j}(k,t)$ through h (k+S−1,t) for subbands k through k+S−1, respectively. These S channel response vectors are indicative of the channel response between antenna j at terminal m and the R antennas at the base station for the S subbands assigned to terminal m. The subband index k for terminal m changes in each hop period and is determined by the FH sequence assigned to terminal m.

The channel response vectors for the U terminals selected for simultaneous data transmission are typically different from one another and may be viewed as "spatial signatures" for these U terminals. The base station may estimate the channel response vectors for each terminal based on pilot symbols received from the terminal, which may be time division multiplexed with data symbols as shown in FIG. 2.

For simplicity, the following description assumes that L=U/N and L single-antenna terminals $m_1$ through $m_L$ are assigned to each subband group in each hop period. An R×L channel response matrix H(k,t) may be formed for each subband k in each hop period t based on the L channel response vectors for the L terminals using subband k in hop period t, as follows:

$$H(k, t) = [\underline{h}_{m_1}(k, t) \; \underline{h}_{m_2}(k, t) \; \ldots \; \underline{h}_{m_L}(k, t)], \quad \text{Eq (6)}$$

$$= \begin{bmatrix} h_{m_1,1}(k, t) & h_{m_2,1}(k, t) & \ldots & h_{m_L,1}(k, t) \\ h_{m_1,2}(k, t) & h_{m_2,2}(k, t) & \ldots & h_{m_L,2}(k, t) \\ \vdots & \vdots & \ddots & \vdots \\ h_{m_1,R}(k, t) & h_{m_2,R}(k, t) & \ldots & h_{m_L,R}(k, t) \end{bmatrix},$$

for $k = 1 \ldots K$, where $\underline{h}_{m_l}(k,t)$, for $l=1 \ldots L$, is the channel response vector for the l-th terminal using subband k in hop period t. The channel response matrix $H(k,t)$ for each subband in each hop period is dependent on the specific set of terminals assigned to that subband and hop period.

The "received" symbols at the base station for each subband k in each symbol period n of each hop period t may be expressed as:

$$\underline{r}(k,t,n) = \underline{H}(k,t) \cdot \underline{x}(k,t,n) + \underline{n}(k,t,n), \text{ for } k=1 \ldots K, \quad \text{Eq (7)}$$

where $\underline{x}(k,t,n)$ is a vector with L "transmit" symbols sent by the L terminals on subband k in symbol period n of hop period t;

$\underline{r}(k,t,n)$ is a vector with R received symbols obtained via the R antennas at the base station for subband k in symbol period n of hop period t; and $\underline{n}(k,t,n)$ is a noise vector for subband k in symbol period n of hop period t.

For simplicity, the channel response matrix $H(k,t)$ is assumed to be constant for an entire hop period and is not a function of symbol period n. Also for simplicity, the noise may be assumed to be additive white Gaussian noise (AWGN) with a zero mean vector and a covariance matrix of $\phi_{nn} = \sigma^2 \cdot I$, where $\sigma^2$ is the variance of the noise and I is the identity matrix.

K transmit symbol vectors, $\underline{x}(k,t,n)$ for $k=1 \ldots K$, are formed for the K subbands in each symbol period of each hop period. Because different sets of terminals may be assigned to different subbands in a given hop period, as determined by their FH sequences, the K transmit symbol vectors $\underline{x}(k,t,n)$ for each symbol period of each hop period may be formed by different sets of terminals. Each vector $\underline{x}(k,t,n)$ contains L transmit symbols sent by the L terminals using subband k in symbol period n of hop period t. In general, each transmit symbol may be a data symbol, a pilot symbol, or a "zero" symbol (which is a signal value of zero).

K received symbol vectors, $\underline{r}(k,t,n)$ for $k=1 \ldots K$, are obtained for the K subbands in each symbol period of each hop period. Each vector $\underline{r}(k,t,n)$ contains R received symbols obtained via the R antennas at the base station for one subband in one symbol period. For a given subband k, symbol period n, and hop period t, the j-th transmit symbol in the vector $\underline{x}(k,t,n)$ is multiplied by the j-th vector/column of the channel response matrix $H(k,t)$ to generate a vector $\underline{r}_j(k,t,n)$. The L transmit symbols in $\underline{x}(k,t,n)$, which are sent by L different terminals, are multiplied by the L columns of $H(k,t)$ to generate L vectors $\underline{r}_1(k,t,n)$ through $\underline{r}_L(k,t,n)$, one vector $\underline{r}_j(k,t,n)$ for each terminal. The vector $\underline{r}(k,t,n)$ obtained by the base station is composed of the L vectors $\underline{r}_1(k,t,n)$ through $\underline{r}_L(k,t,n)$, or $$\underline{r}(k, t, n) = \sum_{j=1}^{L} \underline{r}_j(k, t, n).$$

Each received symbol in $\underline{r}(k,t,n)$ thus contain a component of each of the L transmit symbols in $\underline{x}(k,t,n)$. The L transmit symbols sent simultaneously by the L terminals on each subband k in each symbol period n of each hop period t thus interfere with one another at the base station.

The base station may use various receiver spatial processing techniques to separate out the data transmissions sent simultaneously by the L terminals on each subband in each symbol period. These receiver spatial processing techniques include a zero-forcing (ZF) technique, a minimum mean square error (MMSE) technique, a maximal ratio combining (MRC) technique, and so on.

For the zero-forcing technique, the base station may derive a spatial filter matrix $M_{zf}(k,t)$ for each subband k in each hop period t, as follows:

$$M_{zf}(k,t) = [H^H(k,t) \cdot H(k,t)]^{-1} \cdot H^H(k,t), \quad \text{Eq (8)}$$

where "$H$" denotes a conjugate transpose. The base station estimates the channel response matrix $H(k,t)$ for each subband, e.g., based on pilots transmitted by the terminals. The base station then uses the estimated channel response matrix $\hat{H}(k,t)$ to derive the spatial filter matrix. For clarity, the following description assumes no estimation error so that $\hat{H}(k,t) = H(k,t)$. Because $H(k,t)$ is assumed to be constant across hop period t, the same spatial filter matrix $M_{zf}(k,t)$ may be used for all symbol periods in hop period t.

The base station may perform zero-forcing processing for each subband k in each symbol period n of each hop period t, as follows:

$$\hat{\underline{x}}_{zf}(k, t, n) = \underline{M}_{zf}(k, t) \cdot \underline{r}(k, t, n), \quad \text{Eq (9)}$$

$$= [\underline{H}^H(k, t) \cdot \underline{H}(k, t)]^{-1} \cdot \underline{H}^H(k, t) \cdot$$

$$[\underline{H}(k, t) \cdot \underline{x}(k, t, n) + \underline{n}(k, t, n)],$$

$$= \underline{x}(k, t, n) + \underline{n}_{zf}(k, t, n),$$

where $\hat{\underline{x}}_{zf}(k,t,n)$ is a vector with L "detected" data symbols for subband k in symbol period n of hop period t; and $\underline{n}_{zf}(k,t,n)$ is the noise after the zero-forcing processing.

A detected data symbol is an estimate of a data symbol sent by a terminal

For the MMSE technique, the base station may derive a spatial filter matrix $M_{mmse}(k,t)$ for each subband k in each hop period t, as follows:

$$M_{mmse}(k,t) = [H^H(k,t) \cdot H(k,t) + \sigma^2 \cdot I]^{-1} \cdot H^H(k,t). \quad \text{Eq (10)}$$

If the covariance matrix $\phi_{nn}$ of the noise is known, then this covariance matrix may be used in place of $\sigma^2 \cdot I$ in equation (10).

The base station may perform MMSE processing for each subband k in each symbol period n of each hop period t, as follows:

$$\hat{\underline{x}}_{mmse}(k, t, n) = \underline{D}_{mmse}^{-1}(k, t) \cdot \underline{M}_{mmse}(k, t) \cdot \underline{r}(k, t, n), \quad \text{Eq (11)}$$

$$= \underline{D}_{mmse}^{-1}(k, t) \cdot \underline{M}_{mmse}(k, t) \cdot$$

-continued $$[\underline{H}(k,t) \cdot \underline{x}(k,t,n) + \underline{n}(k,t,n)],$$

$$\cong \underline{x}(k,t,n) + \underline{n}_{mmse}(k,t,n),$$

where $D_{mmse}(k,t)$ is a diagonal vector containing the diagonal elements of a matrix $[M_{mmse}(k,t) \cdot H(k,t)]$, or $D_{mmse}(k,t) = \text{diag}[M_{mmse}(k,t) \cdot H(k,t)]$; and $n_{mmse}(k,t,n)$ is the noise after the MMSE processing.

The symbol estimates from the spatial filter $M_{mmse}(k,t)$ are unnormalized estimates of the transmit symbols in $x(k,t,n)$. The multiplication with the scaling matrix $D_{mmse}^{-1}(k,t)$ provides normalized estimates of the transmit symbols.

For the MRC technique, the base station may derive a spatial filter matrix $M_{mrc}(k,t)$ for each subband k in each hop period t, as follows:

$$M_{mrc}(k,t) = H^H(k,t) \qquad \text{Eq (12)}$$

The base station may perform MRC processing for each subband k in each symbol period n of each hop period t, as follows:

$$\hat{\underline{x}}_{mrc}(k,t,n) = \underline{D}_{mrc}^{-1}(k,t) \cdot \underline{M}_{mrc}(k,t) \cdot \underline{r}(k,t,n), \qquad \text{Eq (13)}$$

$$= \underline{D}_{mrc}^{-1}(k,t) \cdot \underline{H}^H(k,t) \cdot$$

$$[\underline{H}(k,t) \cdot \underline{x}(k,t,n) + \underline{n}(k,t,n)],$$

$$\cong \underline{x}(k,t,n) + \underline{n}_{mrc}(k,t,n),$$

where $D_{mrc}(k,t)$ is a diagonal vector containing the diagonal elements of a matrix $[H^H(k,t) \cdot H(k,t)]$, or $D_{mrc}(k,t) = \text{diag}[H^H(k,t) \cdot H(k,t)]$; and $n_{mrc}(k,t,n)$ is the noise after the MRC processing.

In general, different sets of terminals may be assigned to different subband groups in a given hop period, as determined by their FH sequences. The N terminal sets for the N subband groups in a given hop period may contain the same or different numbers of terminals. Furthermore, each terminal set may contain single-antenna terminals, multi-antenna terminals, or a combination of both. Different sets of terminals (which may again contain the same or different numbers of terminals) may also be assigned to a given subband in different hop periods. The channel response matrix H(k,t) for each subband in each hop period is determined by the set of terminals using that subband in that hop period and contains one or more vectors/columns for each terminal transmitting on that subband in that hop period. The matrix H(k,t) may contain multiple vectors for a terminal using multiple antennas to transmit different data symbols to the base station.

As shown above, the multiple data transmissions sent simultaneously from up to L terminals on each subband k in each symbol period n of each hop period t may be separated by the base station based on their uncorrelated spatial signatures, which are given by their channel response vectors $h_{m_l}(k,t)$. This allows FH-QOFDMA to enjoy higher capacity when the number of antennas used for data reception increases. Furthermore, FH-QOFDMA reduces the amount of intra-cell interference observed on each subband in each hop period so that better utilization of the additional capacity created in the spatial dimension can be achieved.

Figure 5:
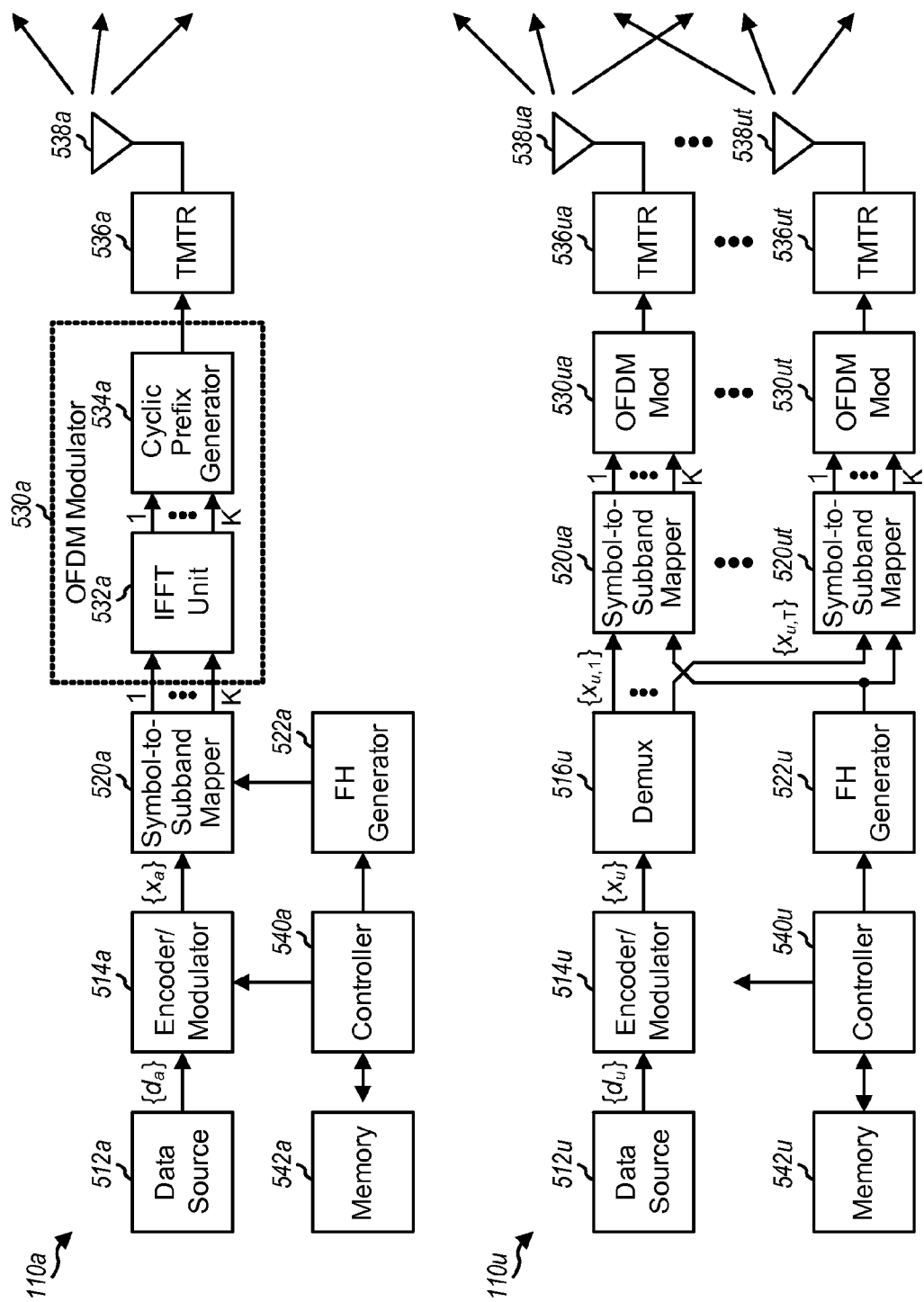
FIG. 5 shows a block diagram of a single-antenna terminal and a multi-antenna terminal.

FIG. 5 shows a block diagram of an embodiment of single-antenna terminal 110a and multi-antenna terminal 110u. At single-antenna terminal 110a, an encoder/modulator 514a receives traffic/packet data (denoted as $\{d_a\}$) from a data source 512a and possibly overhead/signaling data from a controller 540a, processes (e.g., encodes, interleaves, and symbol maps) the data based on one or more coding and modulation schemes selected for terminal 110a, and provides data symbols (denoted as $\{x_a\}$) for terminal 110a. Each data symbol is a modulation symbol, which is a complex value for a point in a signal constellation for a modulation scheme (e.g., M-PSK or M-QAM).

A symbol-to-subband mapper 520a receives the data symbols and pilot symbols and provides these symbols onto the proper subband(s) in each symbol period of each hop period, as determined by an FH control from an FH generator 522a. FH generator 522a may generate the FH control based on an FH sequence or a traffic channel assigned to terminal 110a. FH generator 522a may be implemented with look-up tables, PN generators, and so on. Mapper 520a also provides a zero symbol for each subband not used for pilot or data transmission. For each symbol period, mapper 520a outputs K transmit symbols for the K total subbands, where each transmit symbol may be a data symbol, a pilot symbol, or a zero symbol.

An OFDM modulator 530a receives K transmit symbols for each symbol period and generates a corresponding OFDM symbol for that symbol period. OFDM modulator 530a includes an inverse fast Fourier transform (IFFT) unit 532 and a cyclic prefix generator 534. For each symbol period, IFFT unit 532 transforms K transmit symbols to the time domain using a K-point IFFT to obtain a "transformed" symbol that contains K time-domain samples. Each sample is a complex value to be transmitted in one sample period. Cyclic prefix generator 534 repeats a portion of each transformed symbol to form an OFDM symbol that contains N+C samples, where C is the number of samples being repeated. The repeated portion is often called a cyclic prefix and is used to combat ISI caused by frequency selective fading. An OFDM symbol period (or simply, a symbol period) is the duration of one OFDM symbol and is equal to N+C sample periods. OFDM modulator 530a provides a stream of OFDM symbols to a transmitter unit (TMTR) 536a. Transmitter unit 536a processes (e.g., converts to analog, filters, amplifies, and frequency upconverts) the OFDM symbol stream to generate a modulated signal, which is transmitted from an antenna 538a.

At multi-antenna terminal 110u, an encoder/modulator 514u receives traffic/packet data (denoted as $\{d_u\}$) from a data source 512u and possibly overhead/signaling data from a controller 540u, processes the data based on one or more coding and modulation schemes selected for terminal 110u, and provides data symbols (denoted as $\{x_u\}$) for terminal 110u. A demultiplexer (Demux) 516u demultiplexes the data symbols into T streams for the T antennas at terminal 110u, one data symbol stream $\{x_{u,j}\}$ for each antenna, and provides each data symbol stream to a respective symbol-to-subband mapper 520u. Each mapper 520u receives the data symbols and pilot symbols for its antenna and provides these symbols onto the proper subband(s) in each symbol period of each hop period, as determined by an FH control generated by an FH generator 522u based on an FH sequence or a traffic channel assigned to terminal 110u. Up to T different data symbols or pilot symbols may be sent from the T antennas in each symbol period on each subband assigned to terminal 110u. Each mapper 520u also provides a zero symbol for each subband not used for pilot or data transmission and, for each symbol period, outputs K transmit symbols for the K total subbands to a corresponding OFDM modulator 530u.

Each OFDM modulator 530u receives K transmit symbols for each symbol period, performs OFDM modulation on the K transmit symbols, and generates a corresponding OFDM symbol for the symbol period. T OFDM modulators 530ua through 530ut provide T streams of OFDM symbols to T transmitter units 536ua through 536ut, respectively. Each transmitter unit 536u processes its OFDM symbol stream and generates a corresponding modulated signal. T modulated signals from transmitter units 536ua through 536ut are transmitted from T antennas 538ua through 538ut, respectively.

Controllers 540a and 540u direct the operation at terminals 110a and 110u, respectively. Memory unit 542a and 542u provide storage for program codes and data used by controllers 540a and 540u, respectively.

Figure 6:
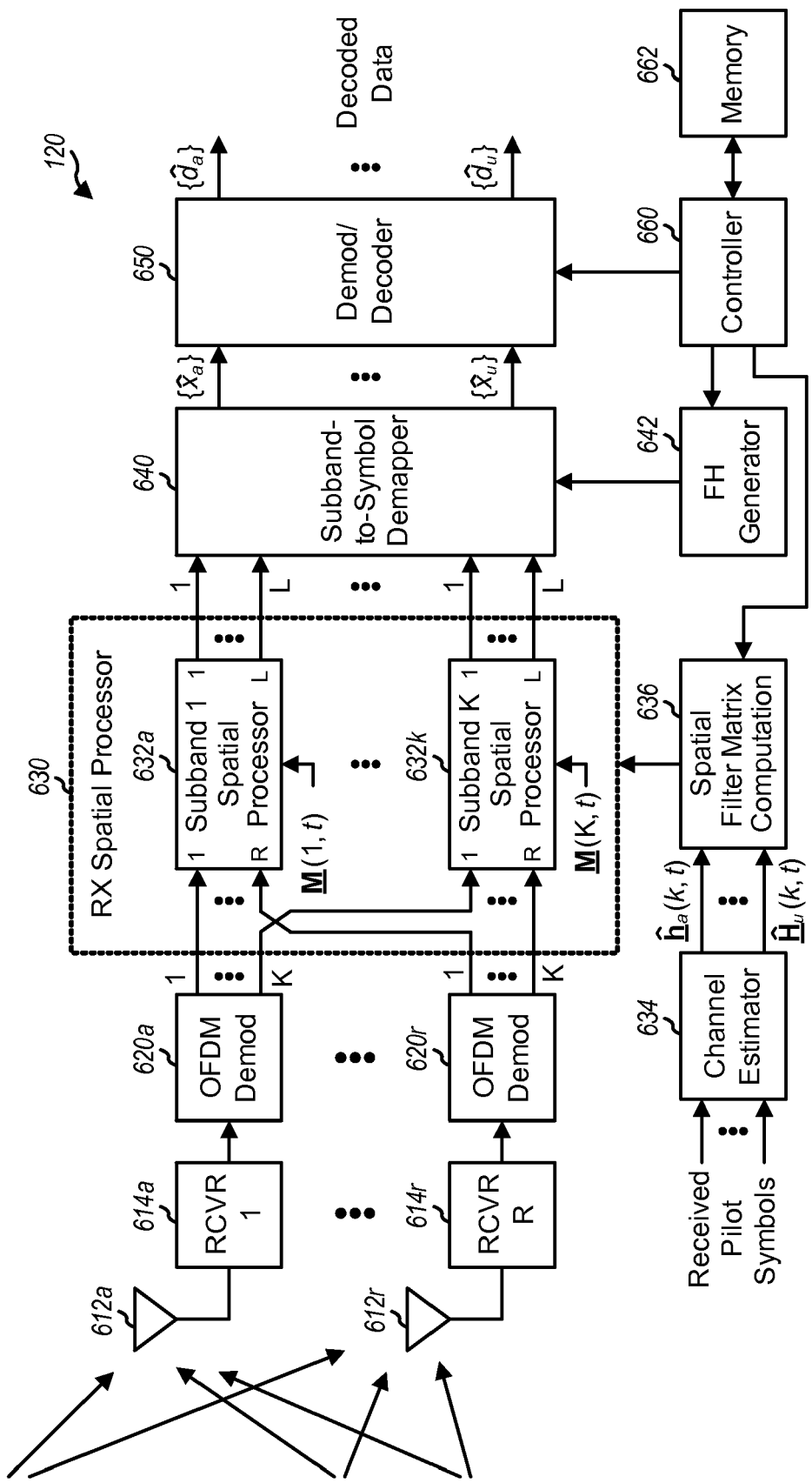
FIG. 6 shows a block diagram of the base station.

FIG. 6 shows a block diagram of an embodiment of base station 120. The modulated signals transmitted by the U terminals selected for data transmission are received by R antennas 612a through 612r, and each antenna provides a received signal to a respective receiver unit (RCVR) 614. Each receiver unit 614 processes (e.g., filters, amplifies, frequency downconverts, and digitizes) its received signal and provides a stream of input samples to an associated OFDM demodulator (Demod) 620. Each OFDM demodulator 620 processes its input samples and provides received symbols. Each OFDM demodulator 620 typically includes a cyclic prefix removal unit and a fast Fourier transform (FFT) unit. The cyclic prefix removal unit removes the cyclic prefix in each received OFDM symbol to obtain a received transformed symbol. The FFT unit transforms each received transformed symbol to the frequency domain with a K-point FFT to obtain K received symbols for the K subbands. For each symbol period, R OFDM demodulators 620a through 620r provide R sets of K received symbols for the R antennas to a receive (RX) spatial processor 630.

Receive (RX) spatial processor 630 includes K subband spatial processors 632a through 632k for the K subbands. Within RX spatial processor 630, the received symbols from OFDM demodulators 620a through 620r for each symbol period are demultiplexed into K vectors of received symbols, $r(k,t,n)$ for $k=1 \ldots K$, which are provided to the K spatial processors 632. Each spatial processor 632 also receives a spatial filter matrix $M(k,t)$ for its subband, performs receiver spatial processing on $r(k,t,n)$ with $M(k,t)$ as described above, and provides a vector $\hat{x}(k,t,n)$ of detected data symbols. For each symbol period, K spatial processors 632 through 632k provide K sets of detected data symbols in K vectors $\hat{x}(k,t,n)$ for the K subbands to a subband-to-symbol demapper 640.

Demapper 640 obtains the K sets of detected data symbols for each symbol period and provides detected data symbols for each terminal m onto a stream $\{\hat{x}_m\}$ for that terminal, where $m \in \{a \ldots u\}$. The subbands used by each terminal are determined by an FH control generated by an FH generator 642 based on the FH sequence or traffic channel assigned to that terminal. A demodulator/decoder 650 processes (e.g., symbol demaps, deinterleaves, and decodes) the detected data symbols $\{\hat{x}_m\}$ for each terminal and provides decoded data $\{\hat{d}_m\}$ for the terminal.

A channel estimator 634 obtains received pilot symbols from OFDM demodulators 620a through 620r and derives a channel response vector for each antenna of each terminal transmitting to base station 120 based on the received pilot symbols for the terminal. A spatial filter matrix computation unit 636 forms a channel response matrix $H(k,t)$ for each subband in each hop period based on the channel response vectors of all terminals using that subband and hop period. Computation unit 636 then derives the spatial filter matrix $M(k,t)$ for each subband of each hop period based on the channel response matrix $H(k,t)$ for that subband and hop period and further using the zero-forcing, MMSE, or MRC technique, as described above. Computation unit 636 provides K spatial filter matrices for the K subbands in each hop period to K subband spatial processors 632a through 632k.

A controller 660 directs the operation at base station 120. A memory unit 662 provides storage for program codes and data used by controller 660.

For clarity, quasi-orthogonal multiplexing has been specifically described for the reverse link of a frequency hopping OFDMA system. Quasi-orthogonal multiplexing may also be used for other multiple-carrier communication systems whereby the multiple subbands may be provided by some means other than OFDM.

Quasi-orthogonal multiplexing may also be used for the forward link. For example, a terminal equipped with multiple antennas may receive data transmission from multiple base stations (e.g., one data symbol from each of the multiple base stations on each subband in each symbol period). Each base station may transmit to the terminal using a different FH sequence that the base station assigned to the terminal. The FH sequences used by the different base stations for the terminal may not be orthogonal to one another. Multiple base stations may send multiple data symbols on the same subband in the same symbol period to the terminal whenever these FH sequences collide. The terminal may use receiver spatial processing to separate out the multiple data symbols sent simultaneously on the same subband in the same symbol period by the multiple base stations.

The quasi-orthogonal multiplexing techniques described herein may be implemented by various means. For example, these techniques may be implemented in hardware, software, or a combination thereof. For a hardware implementation, the processing units used for quasi-orthogonal multiplexing at a transmitting entity (e.g., as shown in FIG. 5) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used for quasi-orthogonal multiplexing at a receiving entity (e.g., as shown in FIG. 6) may also be implemented within one or more ASICs, DSPs, and so on.

For a software implementation, the quasi-orthogonal multiplexing techniques may be implemented with modules (e.g., procedures, functions, and so on) that perform the functions described herein. The software codes may be stored in a memory unit (e.g., memory unit 542a or 542u in FIG. 5 or memory unit 662 in FIG. 6) and executed by a processor (e.g., controller 540a or 540u in FIG. 5 or controller 660 in FIG. 6). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of communicating in a wireless communication system, comprising:

assigning a plurality of terminals with traffic channels in a plurality of sets of traffic channels for a base station, wherein each set includes a plurality of traffic channels that are orthogonal to one another, and wherein the traffic channels in each set are not orthogonal to the traffic channels in each of the remaining sets; and communicating with the plurality of terminals on the traffic channels assigned to the plurality of terminals using at least one transceiver, each transceiver in the at least one transceiver supporting communication on the plurality of sets of traffic channels.

2. The method of claim 1, wherein each traffic channel is mapped to at least one subcarrier in each time interval.

3. The method of claim 1, wherein each traffic channel is mapped to a plurality of contiguous subcarriers in each time interval.

4. The method of claim 1, wherein each traffic channel is mapped to a plurality of non-contiguous subcarriers in each time interval.

5. The method of claim 1, wherein the traffic channels in each set are mapped to subcarriers that are pseudo-random with respect to subcarriers for the traffic channels in each of the remaining sets.

6. The method of claim 1, wherein the system utilizes frequency hopping, and wherein each traffic channel in each set is associated with a respective hopping sequence that pseudo-randomly selects different subcarriers in different time intervals for the traffic channel.

7. The method of claim 6, wherein the plurality of sets of traffic channels are associated with a plurality of pseudo-random number (PN) codes, one PN code for each set of traffic channels, and wherein hopping sequences for the traffic channels in each set are generated based on the PN code for the set.

8. The method of claim 7, wherein the plurality of PN codes for the plurality of sets of traffic channels are different time shifts of a common PN code.

9. The method of claim 1, wherein the plurality of sets of traffic channels are mapped to subcarriers based on a plurality of mapping tables, one mapping table for each set of traffic channels.

10. The method of claim 1, wherein the plurality of sets of traffic channels comprise a minimum number of sets of traffic channels to support the plurality of terminals.

11. The method of claim 1, wherein the assigning the plurality of terminals with traffic channels comprises
arranging the plurality of terminals into a plurality of groups of terminals, one group of terminals for each of the plurality of sets of traffic channels, and
assigning each group of terminals with traffic channels in a respective set of traffic channels.

12. The method of claim 11, wherein the arranging the plurality of terminals comprises arranging the plurality of terminals into the plurality of groups of terminals based on received signal qualities for the plurality of terminals.

13. The method of claim 12, wherein each group includes terminals having similar received signal qualities.

14. The method of claim 11, wherein the arranging the plurality of terminals comprises arranging the plurality of terminals into the plurality of groups of terminals based on margins for the plurality of terminals, wherein a margin for a terminal is indicative of a difference between received signal quality and required signal quality for the terminal.

15. The method of claim 11, wherein the arranging the plurality of terminals comprises arranging the plurality of terminals into the plurality of groups of terminals based on spatial signatures of the plurality of terminals, wherein a spatial signature of a terminal is determined by a channel response for the terminal.

16. The method of claim 1, wherein the communicating with the plurality of terminals comprises sending data transmissions to the plurality of terminals on the traffic channels assigned to the plurality of terminals.

17. The method of claim 1, wherein the communicating with the plurality of terminals comprises receiving data transmissions sent by the plurality of terminals on the traffic channels assigned to the plurality of terminals.

18. The method of claim 17, further comprising:
performing spatial processing for the received data transmissions to recover data sent by the plurality of terminals.

19. The method of claim 18, wherein the performing spatial processing comprises
obtaining a channel estimate for each of the plurality of terminals based on pilot symbols received from the terminal, and
performing spatial processing based on channel estimates for the plurality of terminals.

20. The method of claim 1, further comprising:
adjusting transmit power of each of the plurality of terminals to obtain a target received signal quality for the terminal at the base station.

21. The method of claim 1, wherein the communication system utilizes orthogonal frequency division multiplexing (OFDM).

22. The method of claim 1, wherein the communication system utilizes a multi-carrier modulation technique providing a plurality of subcarriers for transmission.

23. A method of communicating in a wireless communication system, comprising:
assigning U terminals with traffic channels in L sets of traffic channels for a base station, wherein L is greater than one and U is one or greater, wherein each set includes a plurality of traffic channels that are orthogonal to one another, and wherein the traffic channels in each set are not orthogonal to the traffic channels in each of the L−1 other sets;
receiving data transmissions sent by the U terminals on the traffic channels assigned to the U terminals;
obtaining a group of received symbols for each of K subcarriers used for the data transmissions sent by the U terminals, each group including R received symbols for R antennas, where R and K are each greater than one;
performing spatial processing on the group of received symbols for each subcarrier to obtain a group of detected data symbols for the subcarrier; and
demultiplexing K groups of detected data symbols for the K subcarriers to obtain detected data symbols for each of the U terminals.

24. The method of claim 23, wherein the performing spatial processing comprises
forming a channel response matrix for each of the K subcarriers based on at least one channel estimate for at least one terminal transmitting on the subcarrier,
determining a spatial filter matrix for each subcarrier based on the channel response matrix for the subcarrier, and
performing spatial processing for each subcarrier with the spatial filter matrix for the subcarrier.

25. The method of claim 24, wherein the spatial filter matrix for each subcarrier is determined based further on a zero-forcing (ZF) technique.

26. The method of claim 24, wherein the spatial filter matrix for each subcarrier is determined based further on a minimum mean square error (MMSE) technique.

27. The method of claim 24, wherein the spatial filter matrix for each subcarrier is determined based further on a maximal ratio combining (MRC) technique.

28. An apparatus for wireless communication, comprising:
means for assigning a plurality of terminals with traffic channels in a plurality of sets of traffic channels for a base station, wherein each set includes a plurality of traffic channels that are orthogonal to one another, and wherein the traffic channels in each set are not orthogonal to the traffic channels in each of the remaining sets; and
means for communicating with the plurality of terminals on the traffic channels assigned to the plurality of terminals using at least one transceiver, each transceiver in the at least one transceiver supporting communication on the plurality of sets of traffic channels.

29. The apparatus of claim 28, wherein the traffic channels in each set are mapped to subcarriers that are pseudo-random with respect to subcarriers for the traffic channels in each of the remaining sets.

30. The apparatus of claim 28, wherein the means for assigning the plurality of terminals with traffic channels comprises
means for arranging the plurality of terminals into a plurality of groups of terminals, one group of terminals for each of the plurality of sets of traffic channels, and
means for assigning each group of terminals with traffic channels in a respective set of traffic channels.

31. The apparatus of claim 28, wherein the means for communicating with the plurality of terminals comprises means for sending data transmissions to the plurality of terminals on the traffic channels assigned to the plurality of terminals.

32. The apparatus of claim 28, wherein the means for communicating with the plurality of terminals comprises means for receiving data transmissions sent by the plurality of terminals on the traffic channels assigned to the plurality of terminals.

33. The apparatus of claim 32, further comprising:
means for performing spatial processing for the received data transmissions to recover data sent by the plurality of terminals.

34. An apparatus for wireless communication, comprising:
at least one processor configured to assign a plurality of terminals with traffic channels in a plurality of sets of traffic channels for a base station, and to communicate with the plurality of terminals on the traffic channels assigned to the plurality of terminals, wherein each set includes a plurality of traffic channels that are orthogonal to one another, and wherein the traffic channels in each set are not orthogonal to the traffic channels in each of the remaining sets; and
at least one transceiver configured to communicate with the plurality of terminals on the traffic channels assigned to the plurality of terminals, each transceiver in the at least one transceiver supporting communication on the plurality of sets of traffic channels.

35. The apparatus of claim 34, wherein the traffic channels in each set are mapped to subcarriers that are pseudo-random with respect to subcarriers for the traffic channels in each of the remaining sets.

36. The apparatus of claim 34, wherein the at least one processor is configured to arrange the plurality of terminals into a plurality of groups of terminals, one group of terminals for each of the plurality of sets of traffic channels, and to assign each group of terminals with traffic channels in a respective set of traffic channels.

37. The apparatus of claim 34, wherein the at least one processor is configured to send data transmissions to the plurality of terminals on the traffic channels assigned to the plurality of terminals.

38. The apparatus of claim 34, wherein the at least one processor is configured to receive data transmissions sent by the plurality of terminals on the traffic channels assigned to the plurality of terminals.

39. The apparatus of claim 38, wherein the at least one processor is configured to perform spatial processing for the received data transmissions to recover data sent by the plurality of terminals.

40. A computer program product, comprising:
a non-transitory computer-readable medium comprising:
code for causing at least one processor to assign a plurality of terminals with traffic channels in a plurality of sets of traffic channels for a base station, wherein each set includes a plurality of traffic channels that are orthogonal to one another, and wherein the traffic channels in each set are not orthogonal to the traffic channels in each of the remaining sets, and
code for causing the at least one processor to communicate with the plurality of terminals on the traffic channels assigned to the plurality of terminals using at least one transceiver, each transceiver in the at least one transceiver supporting communication on the plurality of sets of traffic channels.

41. A method of communicating in a wireless communication system, comprising:
determining a traffic channel assigned to a terminal, wherein the traffic channel is selected from among a plurality of sets of traffic channels for a base station, wherein each set includes a plurality of traffic channels that are orthogonal to one another, and wherein the traffic channels in each set are not orthogonal to the traffic channels in each of the remaining sets; and
communicating with the base station on the traffic channel using at least one transceiver, each transceiver in the at least one transceiver supporting communication on the plurality of sets of traffic channels.

42. The method of claim 41, wherein the traffic channel is mapped to at least one subcarrier in each time interval.

43. The method of claim 41, wherein the system utilizes frequency hopping, and wherein the traffic channel is associated with a hopping sequence that pseudo-randomly selects different subcarriers in different time intervals for the traffic channel.

44. The method of claim 41, wherein the communicating with the base station comprises receiving data transmission from the base station on the traffic channel.

45. The method of claim 41, wherein the communicating with the base station comprises sending data transmission on the traffic channel to the base station.

46. The method of claim 45, wherein the sending data transmission on the traffic channel comprises
time division multiplexing data symbols and pilot symbols, and
mapping the time division multiplexed data symbols and pilot symbols to subcarriers for the traffic channel.

47. The method of claim 41, wherein the communicating with the base station comprises transmitting data symbols and pilot symbols from one antenna at the terminal.

48. The method of claim 41, wherein the communicating with the base station comprises transmitting data symbols and pilot symbols from a plurality of antennas at the terminal.

49. The method of claim 41, further comprising:
adjusting transmit power of the terminal to obtain a target received signal quality for the terminal at the base station.

50. The method of claim 41, wherein the communication system utilizes orthogonal frequency division multiplexing (OFDM).

51. The method of claim 41, wherein the communication system utilizes a multi-carrier modulation technique providing a plurality of subcarriers for transmission.

52. An apparatus for wireless communication, comprising:
means for determining a traffic channel assigned to a terminal, wherein the traffic channel is selected from among a plurality of sets of traffic channels for a base station, wherein each set includes a plurality of traffic channels that are orthogonal to one another, and wherein the traffic channels in each set are not orthogonal to the traffic channels in each of the remaining sets; and
means for communicating with the base station on the traffic channel using at least one transceiver, each transceiver in the at least one transceiver supporting communication on the plurality of sets of traffic channels.

53. The apparatus of claim 52, wherein the means for communicating with the base station comprises means for receiving data transmission from the base station on the traffic channel.

54. The apparatus of claim 52, wherein the means for communicating with the base station comprises means for sending data transmission on the traffic channel to the base station.

55. The apparatus of claim 54, wherein the means for sending data transmission on the traffic channel comprises
means for time division multiplexing data symbols and pilot symbols, and
means for mapping the time division multiplexed data symbols and pilot symbols to subcarriers for the traffic channel.

56. An apparatus for wireless communication, comprising:
at least one processor configured to determine a traffic channel assigned to a terminal, and to communicate with a base station on the traffic channel, wherein the traffic channel is selected from among a plurality of sets of traffic channels for the base station, wherein each set includes a plurality of traffic channels that are orthogonal to one another, and wherein the traffic channels in each set are not orthogonal to the traffic channels in each of the remaining sets; and
at least one transceiver configured to communicate with the base station on the traffic channel using at least one transceiver, each of the at least one transceiver supporting communication on the plurality of sets of traffic channels.

57. The apparatus of claim 56, wherein the at least one processor is configured to receive data transmission from the base station on the traffic channel.

58. The apparatus of claim 56, wherein the at least one processor is configured to send data transmission on the traffic channel to the base station.

59. The apparatus of claim 58, wherein the at least one processor is configured to time division multiplex data symbols and pilot symbols and to map the time division multiplexed data symbols and pilot symbols to subcarriers for the traffic channel.

60. A computer program product, comprising:
a non-transitory computer-readable medium comprising:
code for causing at least one processor to determine a traffic channel assigned to a terminal, wherein the traffic channel is selected from among a plurality of sets of traffic channels for a base station, wherein each set includes a plurality of traffic channels that are orthogonal to one another, and wherein the traffic channels in each set are not orthogonal to the traffic channels in each of the remaining sets, and
code for causing the at least one processor to communicate with the base station on the traffic channel using at least one transceiver, each transceiver in the at least one transceiver supporting communication on the plurality of sets of traffic channels.

61. An apparatus for communication in a wireless communication system, comprising:
means for assigning U terminals with traffic channels in L sets of traffic channels for a base station, wherein L is greater than one and U is one or greater, wherein each set includes a plurality of traffic channels that are orthogonal to one another, and wherein the traffic channels in each set are not orthogonal to the traffic channels in each of the L−1 other sets;
means for receiving data transmissions sent by the U terminals on the traffic channels assigned to the U terminals;
means for obtaining a group of received symbols for each of K subcarriers used for the data transmissions sent by the U terminals, each group including R received symbols for R antennas, where R and K are each greater than one;
means for performing spatial processing on the group of received symbols for each subcarrier to obtain a group of detected data symbols for the subcarrier; and
means for demultiplexing K groups of detected data symbols for the K subcarriers to obtain detected data symbols for each of the U terminals.

62. The apparatus of claim 61, wherein the means for performing spatial processing comprises
means for forming a channel response matrix for each of the K subcarriers based on at least one channel estimate for at least one terminal transmitting on the subcarrier,
means for determining a spatial filter matrix for each subcarrier based on the channel response matrix for the subcarrier, and
means for performing spatial processing for each subcarrier with the spatial filter matrix for the subcarrier.

63. The apparatus of claim 61, wherein the spatial filter matrix for each subcarrier is determined based further on a zero-forcing (ZF) technique.

64. The apparatus of claim 61, wherein the spatial filter matrix for each subcarrier is determined based further on a minimum mean square error (MMSE) technique.

65. The apparatus of claim 61, wherein the spatial filter matrix for each subcarrier is determined based further on a maximal ratio combining (MRC) technique.

66. The apparatus of claim 61, wherein the at least one processor is configured to:
form a channel response matrix for each of the K subcarriers based on at least one channel estimate for at least one terminal transmitting on the subcarrier,
determine a spatial filter matrix for each subcarrier based on the channel response matrix for the subcarrier, and
perform spatial processing for each subcarrier with the spatial filter matrix for the subcarrier.

67. The apparatus of claim 61, wherein the spatial filter matrix for each subcarrier is determined based further on a zero-forcing (ZF) technique.

68. The apparatus of claim 61, wherein the spatial filter matrix for each subcarrier is determined based further on a minimum mean square error (MMSE) technique.

69. The apparatus of claim 61, wherein the spatial filter matrix for each subcarrier is determined based further on a maximal ratio combining (MRC) technique.

70. An apparatus for communication in a wireless communication system, comprising:
at least one processor configured to:
assign U terminals with traffic channels in L sets of traffic channels for a base station, wherein L is greater than one and U is one or greater, wherein each set includes a plurality of traffic channels that are orthogonal to one another, and wherein the traffic channels in each set are not orthogonal to the traffic channels in each of the L−1 other sets,
receive data transmissions sent by the U terminals on the traffic channels assigned to the U terminals,
obtain a group of received symbols for each of K subcarriers used for the data transmissions sent by the U terminals, each group including R received symbols for R antennas, where R and K are each greater than one,
perform spatial processing on the group of received symbols for each subcarrier to obtain a group of detected data symbols for the subcarrier, and
demultiplex K groups of detected data symbols for the K subcarriers to obtain detected data symbols for each of the U terminals.

71. A computer program product, comprising:
a non-transitory computer-readable medium comprising:
code for causing at least one processor to assign U terminals with traffic channels in L sets of traffic channels for a base station, wherein L is greater than one and U is one or greater, wherein each set includes a plurality of traffic channels that are orthogonal to one another, and wherein the traffic channels in each set are not orthogonal to the traffic channels in each of the L−1 other sets,
code for causing the at least one processor to receive data transmissions sent by the U terminals on the traffic channels assigned to the U terminals,
code for causing the at least one processor to obtain a group of received symbols for each of K subcarriers used for the data transmissions sent by the U terminals, each group including R received symbols for R antennas, where R and K are each greater than one,
code for causing the at least one processor to perform spatial processing on the group of received symbols for each subcarrier to obtain a group of detected data symbols for the subcarrier, and
code for causing the at least one processor to demultiplex K groups of detected data symbols for the K subcarriers to obtain detected data symbols for each of the U terminals.

\* \* \* \* \*